(12) United States Patent
Kristof et al.

(10) Patent No.: US 11,875,303 B1
(45) Date of Patent: Jan. 16, 2024

(54) GENERATING CUSTOMIZED RETAIL ENVIRONMENT TEMPLATES

(71) Applicant: Amazon Technologies, Inc., Seattle, WA (US)

(72) Inventors: Kael James Kristof, Seattle, WA (US); Jayaraman Anand Rao, Seattle, WA (US); Devin Gorham, Seattle, WA (US); Cuyuan Zhao, Seattle, WA (US); Taylor Angaran Johnson, Seattle, WA (US); James Carlo Mosca, Seattle, WA (US); William Tumey, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 962 days.

(21) Appl. No.: 16/831,081

(22) Filed: Mar. 26, 2020

(51) Int. Cl.
  *G06Q 30/00* (2023.01)
  *G06Q 10/087* (2023.01)
  *G06Q 30/0201* (2023.01)
  *H04W 4/35* (2018.01)
  *H04W 4/029* (2018.01)
  *G06Q 30/0601* (2023.01)

(52) U.S. Cl.
  CPC ....... *G06Q 10/087* (2013.01); *G06Q 30/0201* (2013.01); *G06Q 30/0641* (2013.01); *H04W 4/029* (2018.02); *H04W 4/35* (2018.02)

(58) Field of Classification Search
  CPC ............. G06Q 10/087; G06Q 30/0201; G06Q 30/0641; H04W 4/029; H04W 4/35
  See application file for complete search history.

(56) References Cited

U.S. PATENT DOCUMENTS

| | | | |
|---|---|---|---|
| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 11,568,356 | B1 * | 1/2023 | Rochon ................. G06T 19/006 |
| 2013/0284806 | A1 | 10/2013 | Margalit |
| 2020/0074402 | A1 * | 3/2020 | Adato .............. G06Q 10/06315 |

* cited by examiner

*Primary Examiner* — Alvin L Brown
(74) *Attorney, Agent, or Firm* — Lee & Hayes P.C.

(57) ABSTRACT

This disclosure describes, in part, systems for enabling facilities to customize the layouts of items located within the facilities. For instance, an entity may be associated with multiple facilities. The facilities may be located at various geographic locations, include various retail layouts/sizes, sell various items, and/or the like. As such, it may be difficult to generate planograms that can be used by more than one of the facilities. Therefore, for different facilities, the entity may determine (1) locations of inventory locations within the facilities, (2) categories of items to include at the inventory locations, (3) identifiers of items associated with the categories, (4) quantities of items to include at the inventory locations, and/or the like. The facilities can then use these determinations to determine the actual items, as well as the locations for the actual items, at the inventory locations.

20 Claims, 10 Drawing Sheets

GENERATING CUSTOMIZED RETAIL ENVIRONMENT TEMPLATES

BACKGROUND

Traditional physical stores maintain an inventory of items in customer- accessible areas such that customers can pick items from the inventory and take them to a cashier for acquisition, such as purchase, rental, and so forth. Such physical stores may use planograms to define the locations and quantities of items that are available for acquisition. For example, when a company operates multiple retail stores, such as at different geographic locations, the company may send the same planograms to each of the retail stores. However, when retail stores want to customize the locations and/or quantities of items, the company may be required to generate a custom planogram for each item at each retail store. This can require both human and computing resources.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
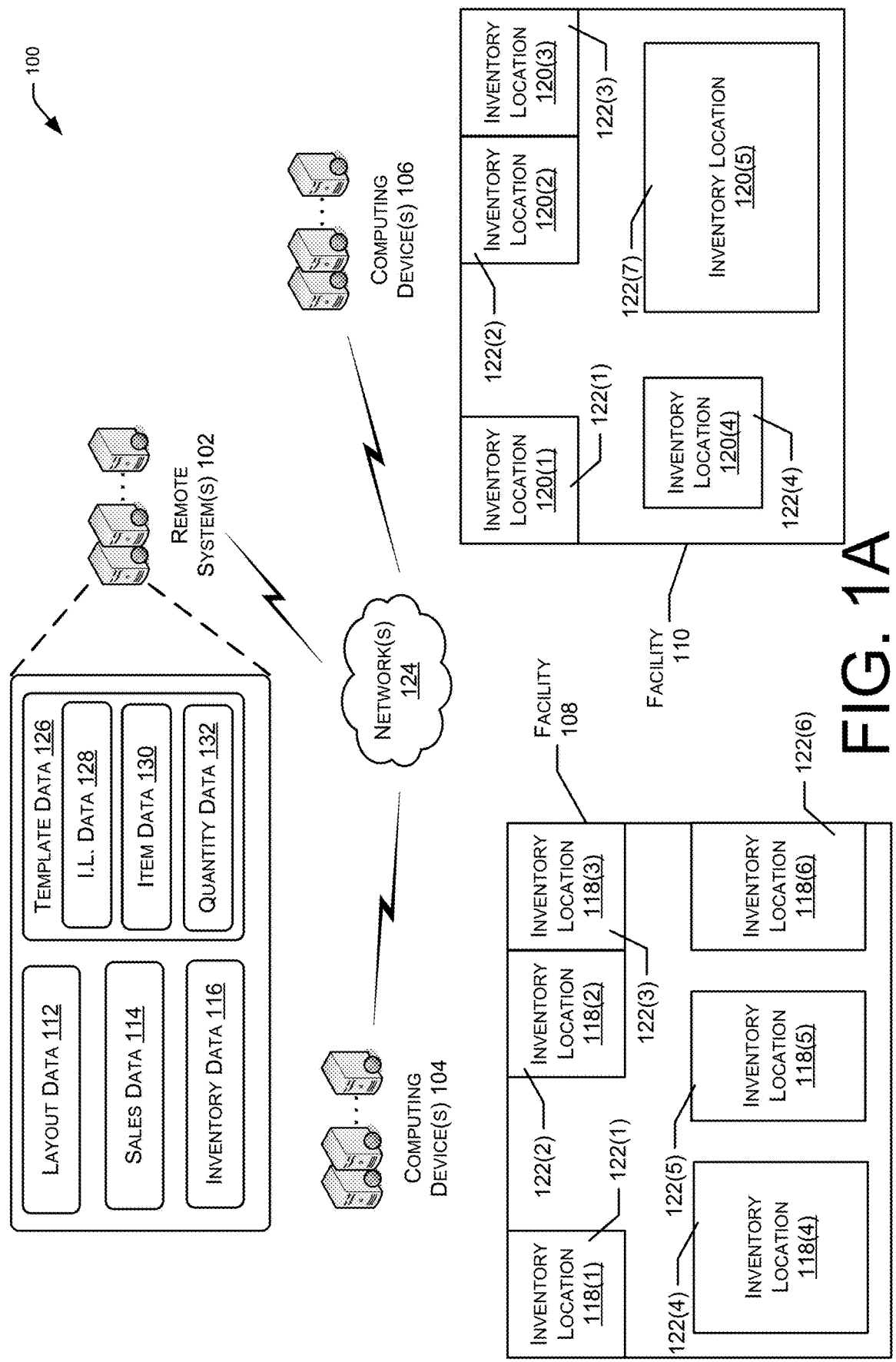
FIG. 1A illustrates an example system for generating different templates for facilities, according to examples of the present disclosure.

This disclosure describes, in part, systems for enabling facilities (e.g., physical retail stores) to customize the layouts of items located within the facilities. For instance, an entity (e.g., company, business, manufacturer, etc.) may be associated with multiple facilities. The facilities may be located at various geographic locations (e.g., cities, states, countries, etc.), include various retail layouts/sizes, sell various items, and/or the like. As such, it may be beneficial to allow the facilities to customize inventory locations located within the facilities. To do this, the entity may generate templates that allow for variations between the facilities when placing items at the inventory locations. A template may indicate (1) a location of inventory location within the facility, (2) a category of items to include at the inventory location, (3) identifiers of items associated with the category of items, (4) a number of items to include at the inventory location, (5) a grouping of the facilities that may use the template, and/or the like. The facilities can then use these templates to select and then place items at the inventory locations.

By performing the processes described herein, the entity is not required to generate and then replicate planograms for the facilities that indicate the variations between the placements of items within the facilities. Rather, the entity is able to generate templates that may be used by more than one facility, where the templates allow the facilities to vary the items that are presented and/or how the items are presented within the facilities. For example, two different facilities may use the same template for a similar inventory location, but the end results of the items located at inventory locations within the facilities may differ. For instance, the inventory locations may differ in the items that are placed at the inventory locations, the locations of the items that are placed at the inventory locations, the number of items that are placed at the inventory locations, and/or the like.

For an example, the entity may be associated with at least a first facility located at a first location, such as a first bookstore located in Los Angeles, and a second facility located at a second location, such as a second bookstore located in New York. The first bookstore may include a first layout that differs from a second layout of the second bookstore. For instance, the first bookstore may include a larger floor layout than the second bookstore. Additionally, sales of books at the first bookstore may be different than sales of books at the second bookstore. For example, users located in Los Angeles may prefer a first category of books, such as sports books, while users located in New York may prefer a second, different category of books, such as travel books.

The entity may be associated with a system that generates templates for the facilities. For instance, the system may store data representing categories of items that may be located at the facilities. Using the example with the bookstores above, the categories of items may include, but are not limited to, best-selling books, fictional books, non-fictional books, history books, geographical books, sports books, travel books, romance books, crime books, drama books, and/or any other categories of books. For a facility, the system may then determine which categories of books should be included in the facility. For example, the system may determine that best-selling books, history books, and sports books should be included in the first bookstore, and that best-selling books, history cooks, and travel books should be included in the second bookstore.

In some instances, the system determines the categories of items based on receiving, from one or more users, inputs indicating the categories of items to include in the facilities. For instance, the system may provide a user interface to user(s). The user(s) may then use the user interface to input the categories of items to use at various facilities. For example, the user(s) may input categories of books that include best-selling books, history books, and sports books for the first bookstore. Additionally, the user(s) may input categories of books that include best-selling books, history books, and travel books for the second bookstore.

Additionally, or alternatively, in some instances, the system determines the categories items based on analyzing data. The data may include, but is not limited to, sales data for items provided by the entity (e.g., either online sales or sales at all of the facilities), sales data for items provided by facilities located in a specific region (e.g., city, state, etc.), sales data for items provided by a specific facility, sales forecast data for items, inventory levels of items at various facilities, interaction data between users and items (e.g., reading speeds of users with books, books selected by users, etc.), and/or the like. For a first example, the system may analyze sales data associated with the first bookstore to determine the categories of books to include at the first bookstore. For instance, the sales data may indicate that the majority of sales at the first bookstore include history books and sports books. For a second example, the system may analyze sales data associated with New York (e.g., the region where the second bookstore is located) to determine the categories books to include at the second bookstore. For instance, the sales data may indicate that the majority of sales in New York include history books and travel books.

The system may then determine the locations of inventory locations within the facilities. An inventory location may include, but is not limited to, an isle, a table, a basket, a shelf, a case, and/or any other type of fixture for which items may be placed. In some instances, an inventory location may include only one type of item. For example, an inventory location included in the first bookstore may only include one type of book (e.g., a single title, a single category of books, etc.). In some instances, an inventory location may include more than one type of item. For instance, an inventory location included in the first bookstore may include two or more types of books (e.g., two or more titles, two or more categories of books, etc.).

In some instances, the system determines the inventory locations based on receiving, from one or more users, inputs indicating the locations of the inventory locations. For instance, the system may provide a user interface (which may be the same user interface described above) to user(s). The user(s) may then use the user interface to input the locations of the inventory locations. Additionally, or alternatively, in some instances, the system determines the inventory locations based on analyzing the data described above. For a first example, the system may analyze the sales data to determine that the top selling books at the first bookstore include sports books. As such, the system may determine that the inventory location that includes the sports books should be located proximate to an entrance of the first bookstore. For a second example, the system may analyze the sales data to determine that, in New York, users that purchase a history book will likely also purchase a travel book. As such, the system may determine that the inventory location that includes history books should be located proximate to the inventory location that includes travel books.

In some instances, the locations of the inventory locations may include absolute locations. For example, the location of the inventory location for sports books may be located a first distance (e.g., one foot, five feet, ten feet, etc.) from a north wall of the first bookstore and a second distance from an east wall of the first bookstore. Additionally, or alternatively, in some instances, the locations of the inventory locations may include relative locations. For a first example, the location of the inventory location for the history books may be located within a threshold distance to the inventory location for the travel books in the second bookstore. As described herein, a threshold distance may include, but is not limited to, one foot, five feet, ten feet, and/or any other distance. For a second example, a location of an inventory location for best-selling books may be located proximate to an entrance of the second bookstore.

The system may further determine which items should be located at the inventory locations. In some instances, the system determines the items based on receiving, from one or more users, inputs indicating identifiers of items to include at the inventory locations. As described herein, an identifier may include, but is not limited to, a name, a numerical identifier, an alphabetic identifier, a mixed numerical and alphabetic identifier, and/or any other type of identifier that identifies an item. For instance, the system may provide a user interface (which may be the same user interface(s) described above) to user(s). The user(s) may then use the user interface to input the identifiers of the items.

Additionally, or alternatively, in some instances, the system determines the items by analyzing data. For a first example, the system may analyze sales data associated with the first bookstore to determine the top five best-selling books at the first bookstore. As such, the system may determine that those five top-selling books should be located at the inventory location associated with best-selling books within the first bookstore. For a second example, the system may analyze sales data associated with New York bookstores to determine the top ten best-selling books within New York. As such, the system may determine that those ten top-selling books should be located at the inventory location associated with best-selling books within the second bookstore. Still, for a third example, the system may analyze data representing the books that are provided by the various facilities associated with the entity. Based on the analysis, the system may identify all of the books that are included with a specific category of books and associate those books with an inventory location.

The system may further determine quantities of items to include the inventory locations. In some instances, the system may determine the quantity of items based on receiving, from one or more users, input indicating the number of items. For instance, the system may provide a user interface (which may be the same user interface(s) described above) to user(s). The user(s) may then use the user interface to input the quantity of items at each inventory location. In some instances, the system indicates the maximum quantity of items that may be located at an inventory location, where the maximum quantity of items is based on the type of inventory location. For instance, a table may be able to hold a first quantity of books while a shelf is able to hold a second, different quantity of books.

Additionally, or alternatively, in some instances, the system may determine the quantity of items based on analyzing the data (e.g., the data above). For a first example, the system may use the size of the inventory location as well as the size of items that are to be located at the inventory location to determine the quantity of items that can be placed at the inventory location. For instance, the system may use the size of the inventory location associated with sports books and the average size of books to determine the quantity of sports books that should be located at the inventory location within the first bookstore. For a second example, the system may use sales data to determine the quantity of items that should be located at an inventory location. For instance, the system may use the sales data associated with history books in New York to determine the quantity of history books that should be located at the inventory location for history books in the second bookstore (e.g., where the number of books increases as the sales increase).

The system may further determine schedules for the inventory location. As described herein, a schedule may indicate a time period at which the inventory location should be located within the inventory location. In some instances, the system may determine the schedule based on receiving, from one or more users, input indicating the schedule. For instance, the system may provide a user interface (which may be the same user interface(s) described above) to user(s). The user(s) may then use the user interface to input the schedules for the inventory location. For example, the user(s) may use the user interface to indicate that the first bookstore should include the inventory location associated with best-selling books between May 1 and June 1.

Additionally, or alternatively, in some instances, the system may determine the schedules based on analyzing the data (e.g., the data above). For a first example, the system may analyze forecast data to determine that a new book is going to be released to the public on May 1, where the new book includes a sports book. As such, the system may determine that the inventory location associated with sports books at the first bookstore should be updated on May 1 to include the new book. For a second example, the system may analyze sales data for books in New York to determine a new list of the ten best-selling books. As such, the system may determine that the inventory location for best-selling books at the second bookstore should be updated May 1 to include the new ten best-selling books.

The system may then generate templates for the facilities, where the templates indicate at least locations of inventory locations within the facilities, categories of items to associate with the inventory locations, lists of items that may be associated with the inventory locations, quantities of items that may be located at the inventory locations, schedules for the inventory locations, and/or the like. In some instances, a single template may be used by more than one facility. For example, the entity may generate a template that is associated with history books, where both the first bookstore and the second bookstore that will include history books may use the same template. Additionally, or alternatively, in some instances, a template may be associated with a single facility. For example, the entity may generate a template that is associated with sports books, where the first bookstore that will include sports books may use the template.

For example, the system may generate a first template for best-selling books for the bookstore and a second template for best-selling books at the second bookstore. This may be because the system determines that the first bookstore should include the top five best-selling books while the second bookstore includes the top ten best-selling books. The entity may further generate a third template associated with history books that can be used by the first bookstore and the second bookstore. Furthermore, the entity may generate a third template for sports books at the first bookstore and a fourth template for history books at the second bookstore.

The individual facilities may then use the template to place items within the respective facilities. For example, the templates indicate the initial lists of items that may be placed at the inventory locations. As such, the computing device(s) associated with the facilities may use the templates to determine the actual items that are to be placed at the inventory locations, where the actual items may be included in the lists of items. Additionally, the computing device(s) may determine the locations of the actual items at the inventory locations. The computing device(s) may then generate data representing the actual items located at the inventory locations as well as the locations of the items.

In some instances, the computing device(s) determine the actual items to include at the inventory locations based on receiving, from one or more users, inputs indicating the actual items. For example, the computing device(s) may display a user interface that includes a template, where the template indicates the initial list of items associated with the inventory location. The computing device(s) may then receive input(s) indicating which items, from the initial list of items, will actually be included at the inventory location. For example, the computing device(s) associated with the first bookstore may display a user interface that includes the template for best-selling books, where the template includes an initial list of five books. The computing device(s) may then receive input(s) selecting four of the five books included in the initial list of books.

Additionally, or alternatively, in some instances, the computing device(s) determine the actual items based on analyzing data. For example, the computing device(s) may receive a template for best-selling books at the second bookstore, where the template includes an initial list of the ten best-selling books in New York. The computing device(s) may then analyze sales data associated with the second bookstore to determine the top ten best-selling books, which are included in the initial list of best-selling books, at the second bookstore. As such, the computing device(s) may select the top ten best-selling books to include at the inventory location.

The computing device(s) may also determine the locations of selected items. In some instances, the computing device(s) determine the locations of the selected items based on receiving, from one or more users, input(s) indicating the locations. For example, the computing device(s) associated with the first bookstore may display a user interface (which may be the same as the user interface above) that includes the template for best-selling books. The computing device(s) may then receive inputs indicating the locations of the selected books at the inventory location.

Additionally, or alternatively, in some instances, the computing device(s) determine the locations of the selected items based on analyzing data. For example, the computing device(s) associated with the second bookstore may analyze the data to determine the best-selling book at the second bookstore, the second best-selling book at the second bookstore, and/or so forth. The computing device(s) may then use determinations to determine the locations of the best-selling books at the inventory location. For instance, the computing device(s) may determine that the best-selling book should be displayed first at the inventory location, followed by the second best-selling book, and/or so forth.

In some instances, by using the templates, more than one facility is able to use the same template and still customize the selection of items and/or placement of the items at inventory locations. For example, the computing device(s) associated with the first bookstore may use the third template, associated with traveling books, to select first books to include at an inventory location within the first bookstore and/or first locations for the first books. Additionally, the second computing device(s) associated with the second bookstore may use the third template to select second books to include at an inventory location within the second bookstore and/or second locations for the second books. Even though both facilities used the same template, the first books may differ from the second books and/or the first locations may differ from the second locations. However, the entity still only needed to generate a single template for the two facilities.

In some instances, the system may update the templates for the inventory locations. For example, when new inventory is going to be distributed to the facilities, the system may update the templates for inventory locations that will include the new inventory. The facilities are then able to use the updated data to update the locations of the items at the inventory locations. For example, if the system determines that the first bookstore should include a new book as part of the best-selling books at the first bookstore, the system may send data representing a new template to the computing device(s) of the first bookstore. The computing device(s) may then use the new template to determine new books to include at the inventory location and/or new locations for the new books.

Although the above examples describe generating templates and/or determining locations of items for bookstores, in other examples, similar processes may be used for other types of facilities (e.g., other types of retail stores). For example, similar processes may be used to customize the locations of items at grocery stores, sporting good stores, electronic stores, and/or any other type of store.

Additionally, as described herein, a category of items may represent items that share at least one common characteristic. For a first example, and at a retail facility, a category of items that includes sports items may include items that are used for sports (e.g., share the common characteristic of sports), such as baseballs, basketballs, bats, and/or any other sporting equipment. For a second example, and still at a retail facility, a category of items that includes baseball items may include items that are used in baseball (e.g., share the common characteristic of baseball), such as baseballs, bats, gloves, and/or any other baseball equipment. Still, for a third example, and at a grocery facility, a category of items that includes vegetable items may include various types of vegetables (e.g., share the common characteristic of being a vegetable), such as celery, lettuce, kale, and/or so forth.

In some instances, the templates may indicate both a category of items associated with an inventory location and a sub-category of items associated with the inventory location. For example, a category of items may include sports items and sub-categories of items may include baseball items, basketball items, soccer items, and/or the like. In such instances, the templates may indicate portions of the inventory location that are associated with the sub-categories. For example, a template may indicate that a first portion of an inventory location is associated with baseball items and a second portion of the inventory location is associated with basketball items.

FIG. 1A illustrates an example system 100 for generating different templates for different facilities, according to examples of the present disclosure. As shown, the system 100 may include at least a remote system(s) 102, computing device(s) 104, and computing device(s) 106. In some instances, the remote system(s) 102 may be associated with an entity, the computing device(s) 104 may be associated with a first facility 108 of the entity, and the computing device(s) 104 may be associated with a second facility 110 of the entity. The first facility 108 may be located at a first location while the second facility 110 may be located at a second, different location. For instance, the first facility 108 may include a first bookstore located in Los Angeles and the second facility 110 may include a second bookstore located in New York.

As shown, the remote system(s) 102 may store data that the remote system(s) 102 uses to generates templates for the facilities. The data may include layout data 112 representing the layouts of the facilities. For instance, the layout data 112 for a given facility may indicate the size the facility, the locations of walls, tables, window, doors, and/or other fixtures of the facility, the number of floors included in the facility, and/or other layout characteristics. The data may further include sales data 114. The sales data 114 may include, but is not limited to, online sales data associated with the entity, sales data associated with the first facility 108, sales data associated with the second entity 110, forecast sales data for the entity/facilities, sales data associated with a region (e.g., city, state, country, etc.), and/or any other type of sales data.

The data may further include inventory data 116. The inventory data 116 may include, but is not limited to, inventory data associated with the entity, inventory data associated with the first facility 108, inventory associated with the second facility 110, and/or any other type of inventory data. In some instances, the inventory data 116 may indicate the identifiers of items that are available, the numbers of items that are available, identifiers of future items that will be available, and/or the like.

The remote system(s) 102 may use the data to generate at least first templates for the first facility 108 and second templates for the second facility 110. For example, the remote system(s) 102 may initially determine which categories of items should be included at the first facility 108 and which categories of items should be included at the second facility 110. In some instances, the remote system(s) 102 determines the categories of items based on receiving input from one or more users. For example, the remote system(s) 102 may receive first inputs indicating that first categories of items should be included at the first facility 108 and second categories of items should be included in the second facility 110. In some examples, the first categories of items may be the same as the second categories of items. In some examples, one or more of the first categories of items may be different than one or more of the second categories of items.

Additionally, or alternatively, in some instances, the remote system(s) 102 determines the categories of items based on analyzing at least a portion of the data. For a first example, the remote system(s) 102 may analyze the sales data 114 associated with the first facility 108 to determine the categories of items that have the best sales at the first facility 108. The remote system(s) 102 may then determine to include those categories of items at the first facility 108. For a second example, the remote system(s) 102 may analyze the sales data 114 associated with a region (e.g., city, state, etc.) that includes the location of the second facility 110 to determine the categories of items that have the best sales in the region. The remote system(s) 102 may then determine to include those categories of items at the second facility 110.

The remote system(s) 102 may further determine the locations and/or type of inventory locations within the facilities. For example, the remote system(s) 102 may determine the locations and/or types of inventory locations 118(1)-(6) that will be included in the first facility 108 and the locations and/or types of inventory locations 120(1)-(5) that will be included in the second facility 110. In some instances, the remote system(s) 102 determines the locations and/or types of inventory locations based on receiving input(s) from one or more users. For instance, the input(s) may indicate the locations and/or types of inventory locations. Additionally, or alternatively, in some instances, the remote system(s) 102 determines the locations and/or types of inventory locations by based on analyzing data.

For a first example, the remote system(s) 102 may analyze the sales data 114 associated with the first facility 108 to determine that a fourth category of items includes better sales than other categories of items at the first facility 108. As such, the remote system(s) 102 may determine to put a large inventory location 118(4) located proximate to the entrance of the first facility 108, where the large inventory location 118(4) is associated with the fourth category of items. For a second example, the remote system(s) 102 may analyze the sales data 114 associated with the region at which the second facility 110 is located to determine that a seventh category of items includes better sales than other categories of items within the region. As such, the remote system(s) 102 may determine to put a large inventory location 120(5) located proximate to the entrance of the second facility 110, where the large inventory location 120(5) is associated with the seventh category of items.

In some instances, the locations and/or the types of inventory locations may be similar between the two facilities. Alternatively, in some instances, and as illustrated in the example of FIG. 1A, the locations and/or types of inventory locations may differ between the two facilities. For example, the first inventory location 118(1), the second inventory location 118(2), and the third inventory location 118(3) included in the first facility 108 may include similar locations and/or types as the first inventory location 120(1), the second inventory location 120(2), and the third inventory location 120(3) included in the second facility 110. However, the fourth inventory location 118(4), the fifth inventory location 118(5), and the sixth inventory location 118(6) included in the first facility 108 may be different than the fourth inventory location 120(4) and the fifth inventory location 120(5) included in the second facility 110.

In some instances, the remote system(s) 102 associates the selected categories (which are represented by 122(1)-(7)) for the facilities with the inventory locations. For example, and as illustrated in the example of FIG. 1A, the remote system(s) 102 may associate a first category of items 122(1) with the first inventory location 118(1), a second category of items 122(2) with the second inventory location 118(2), a third category of items 122(3) with the third inventory location 118(3), a fourth category of items 122(4) with the fourth inventory location 118(4), a fifth category of items 122(5) with the fifth inventory location 118(5), and a sixth category of items 122(6) with the sixth inventory location 118(6). Additionally, the remote system(s) 102 may associate the first category of items 122(1) with the first inventory location 120(1), the second category of items 122(2) with the second inventory location 120(2), the third category of items 122(3) with the third inventory location 120(3), the fourth category of items 122(4) with the fourth inventory location 120(4), and a seventh category 122(7) of items with the fifth inventory location 120(5).

As described above, the remote system(s) 102 may associate the categories of items with the inventory locations based on receiving, from one or more users, inputs indicating that selected categories of items should be located at the inventory locations. Additionally, or alternatively, the remote system(s) 102 may associate the categories of items with the inventory locations based on analyzing data. For a first example, and in the example described above, the remote system(s) may analyze the sales data 114 associated with the first facility 108 to determine that the fourth category of items 122(4) includes better sales than other categories of items at the first facility 108. As such, the remote system(s) 102 may determine to associate the fourth category of items 122(4) with the fourth, largest inventory location 118(4) within the first facility 108. For a second example, the remote system(s) 102 may analyze the sales data 114 associated with the region at which the second facility 110 is located to determine that users that purchase an item included in the second category of items 122(2) also purchase an item included in the third category of items 122(3). As such, the remote system(s) 102 may determine to associate the second category of items 122(2) with the second inventory location 120(2) and associate the third category of items 122(3) with the third inventory location 120(3), where the third inventory location 120(3) is located proximate to the second inventory location 120(2).

In some instances, the remote system(s) 102 determines which items should be located at one or more of the inventory locations. For example, and using the first facility 108, the remote system(s) 102 may determine that five types of items, which are each associated with the first category of items 122(1), should be located at the first inventory location 118(1). In some instances, the remote system(s) 102 makes the determination based on receiving, from one or more users, input(s) indicating the items to include at the inventory locations. Additionally, or alternatively, in some instances, the remote system(s) 102 makes the determination based on analyzing data.

For a first example, the remote system(s) 102 may analyze the sales data 114 associated with the first facility 108 to identity the five best selling items that are associated with the first category of items 122(1). As such, the remote system(s) 102 may determine that the five items should be located at the first inventory location 118(1) associated with the first category of items 122(1). For a second example, the remote system(s) 102 may analyze the sales data 114 associated with the region at which the second facility 110 is located to determine the five best selling items that are associated with the first category of items 122(1). As such, the remote system(s) 102 may determine that the five items should be located at the first inventory location 120(1) associated with the first category of items 122(1).

In some instances, the items selected for the first facility 108 may be the same as the items selected for the second facility 110. For instance, and using the examples above, the five best selling items at the first facility 108 may be the same as the five best selling items in the region that includes the location of the second facility 110. In some instances, one or more of the items selected for the first facility 108 may be different than one or more of the items selected for the second facility 110. For instance, and using the examples above, the five best selling items at the first facility 108 may each be different than the five best selling items in the region that includes the location of the second facility 110. As such, the items selected for the first inventory location 118(1) of the first facility 108 may differ from the items selected for the first inventory location 120(1) of the second facility 110.

In some instances, the remote system(s) 102 may determine the number of items to be located at one or more of the inventory locations. For example, the remote system(s) 102 may determine that five items, which are associated with the first category of items 122(1), should be located at the first inventory location 118(1). Additionally, the remote system (s) 102 may determine that eight items, which are associated with the second category of items 122(2), should be located at the second inventory location 118(2). In some instances, the remote system(s) 102 determine the number of items based on receiving, from one or more users, input(s) indicating the numbers of items. Additionally, or alternatively, in some instances, the remote system(s) 102 determines the number of items based on analyzing data.

For a first example, the remote system(s) 102 may analyze data indicating the size of the third inventory location 118(3) and the average size of items included in the third category of items 122(3). Based on the analysis, the remote system(s) 102 may determine the number of items that are able to be located at the third inventory location 118(3). For a second example, the remote system(s) 102 may analyze inventory data 116 indicating the current inventory of items, which are associated with the fourth category of items 122(4), and currently in stock at the first facility 108. The remote system(s) 102 may then determine if the fourth inventory location 118(4) is large enough to hold the current inventory. If so, then remote system(s) 102 may determine that the number of items to place at the fourth inventory location 118(4) includes the total stock of items.

In some instances, the remote system(s) 102 may determine that the number of items associated with a given category of items differs between facilities. For example, and using the example above, the remote system(s) 102 may determine that the fourth category of items 122(4) should be located at both the fourth inventory location 118(4) of the first facility 108 and the fourth inventory location 120(4) of the second facility 110. However, since the fourth inventory location 118(4) is larger than the fourth inventory location 120(4), the remote system(s) 102 may determine that a greater number of items should be located at the fourth inventory location 118(4) than at the fourth inventory location 120(4).

In some instances, the remote system(s) 102 may determine schedules for the inventory items. A schedule for an inventory item may indicate a time period at which the inventory item should located within the facility, be associated with the selected category of items, include the selected items, and/or the like. In some instances, the remote system(s) 102 determine the schedules based on receiving, from one or more users, input(s) indicating the schedules. Additionally, or alternatively, in some instances, the remote system(s) 102 determines the schedules based on analyzing data.

The remote system(s) 102 may then generate templates for the facilities that include the determined characteristics. Additionally, the remote system(s) 102 may send, over network(s) 124, data to the computing device(s) 104 and/or the computing device(s) 106. For example, the remote system(s) 102 may send, to the computing device(s) 104, at least template data 126 representing the templates for the first facility 108. The template data 126 for an inventory location at the first facility 108 may include at least inventory location data 128 representing the location, category of items, and schedule of the inventory location, item data 130 representing an initial list of items that may be located at the inventory location, quantity data 132 representing the quantity of items that may be located at the inventory location, and/or the like. The remote system(s) 102 may send similar data to the computing device(s) 106.

In some instances, the remote system(s) 102 may generate templates that are used by more than one facility. For instance, the remote system(s) 102 may generate a first template associated with the first category of items 122(1), a second template associated with the second category of items 122(2), and a third template associated with the third category of items 122(3). Both the first facility 108 and the second facility may use the three templates. In some instances, the remote system(s) 102 may generate specific templates for specific facilities. For instance, the remote system(s) 102 may generate a fourth template for the fourth category of items 122(4) at the first facility 108 and a fifth template for the fourth category of items 122(4) at the second facility 110. Additionally, the remote system(s) 102 may generate a sixth template for the fifth category of items 122(5), a seventh template for the sixth category of items 122(6), and an eighth template for the seventh category of items 122(7).

The facilities may then use the templates to place items within the facilities. For instance, and in the example of FIG. 1B, the computing device(s) 104 may receive the template data 126 from the remote system(s) 102. The computing device(s) 104 may then use the template data 126 to determine items to be located at the inventory locations 118(1)-(6) and/or the locations of the items at the inventory locations 118(1)-(6).

Figure 1B:
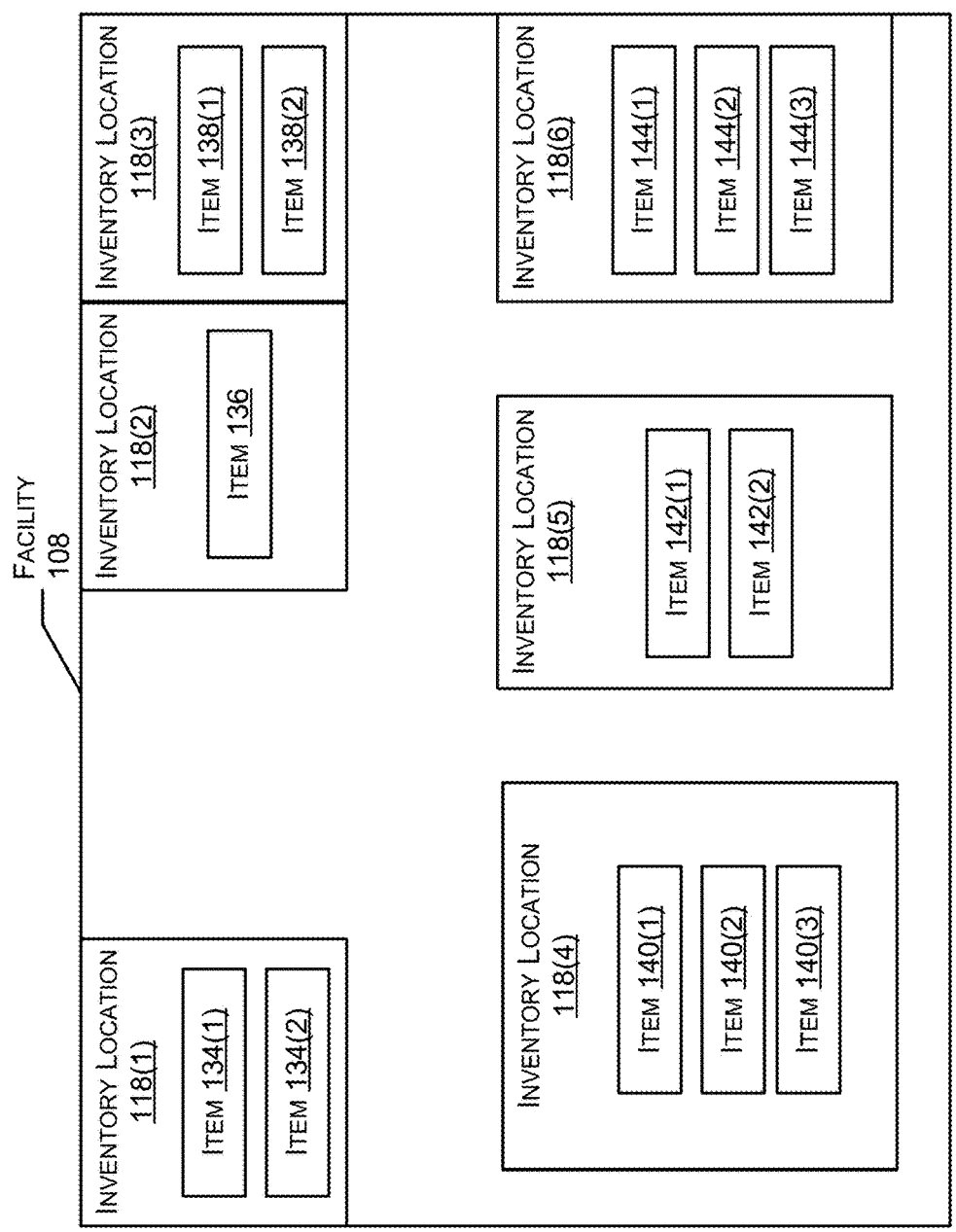
FIGS. 1B-1C illustrate examples of determining locations of items using the templates from the example of FIG. 1A, according to examples of the present disclosure.

For example, and as illustrated in the example of FIG. 1B, the computing device(s) 104 may determine that items 134(1)-(2), which are associated with the first category of items 122(1), are to be placed at the first inventory location 118(1), item 136, which is associated with the second category of items 122(2), is to be placed at the second inventory location 118(2), items 138(1)-(2), which are associated with the third category of items 122(3), are to be placed at the third inventory location 118(3), items 140(1)-(3), which are associated with the fourth category of items 122(4), are to be placed at the fourth inventory location 118(4), items 142(1)-(2), which are associated with the fifth category of items 122(5), are to be placed at the fifth inventory location 118(5), and items 144(1)-(3), which are associated with the sixth category of items 122(6), are to be placed at the sixth inventory location 118(6). In some instances, the computing device(s) 104 determine which items are going to be located at the inventory locations 118(1)-(6) based on receiving, from one or more users, input(s) indicating the items and/or the locations of the items. Additionally, or alternatively, in some instances, the computing device(s) 104 determine which items are going to be located at the inventory locations 118(1)-(6) based on analyzing data.

For example, the computing device(s) 104 may analyze the sales data 114 and/or the item data 130. As discussed herein, the sales data 114 may indicate at least the sales of the items at the first facility 108, the ratings of the items, a sales forecast for the items, and/or the like. Based on the analysis, the computing device(s) 104 may identify the items 134(1)-(2) to located at the first inventory location 118(1). For example, the computing device(s) 104 may determine that the items 134(1)-(2) include the best-selling items at the first facility 108, where the item data 130 indicates that the items 134(1)-(2) may be located at the first inventory location 118(1). For instance, identifiers of the items 134(1)-(2) may be included in the list of items represented by the item data 130. As such, the computing device(s) 104 may select the items 134(1)-(2) for the first inventory location 118(1).

In some instances, the computing device(s) 104 may further determine the locations of the items at the inventory locations 118(1)-(6). For example, and again using the first inventory location 118(1), the computing device(s) 104 may determine that the item 134(1) is to be placed to the left, right, above, below, proximate to, and/or the like with respect to the item 134(2) at the first inventory location 118(1). In some instances, the computing device(s) 104 make the determination based on receiving, from one or more users, inputs indicating the locations of the items 134(1)-(2). In some instances, the computing device(s) 104 may make the determination based on analyzing data. For example, the computing device(s) 104 may analyze the sales data 114 to determine that the item 134(1) sells better at the first facility 108 than the item 134(2). Based on the determination, the computing device(s) 104 may determine that the item 134(1) should be located before the item 134(2) at the first inventory location 118(1).

In some instances, the computing device(s) 104 may generate location data 146 indicating which items are located at the inventory locations 118(1)-(6) and/or the locations of the items at the inventory locations 118(1)-(6). For a first example, the location data 146 may indicate that the items 134(1)-(2) are located at the first location data 118(1). For a second example, the location data 146 may indicate that the item 134(1) is located to the left of the item 134(2) at the first inventory location 118(1).

Figure 1C:
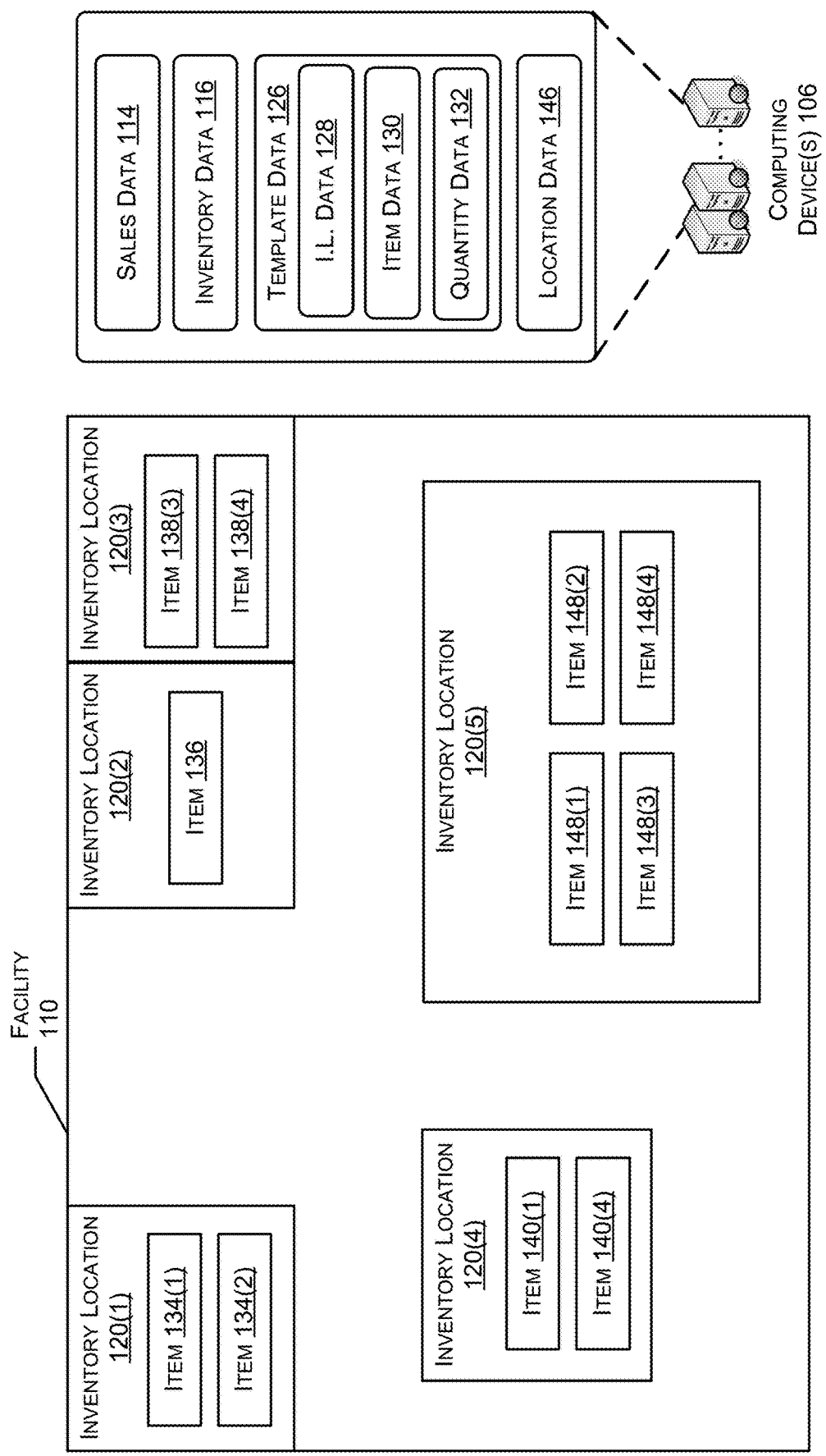

Additionally, and as illustrated in the example of FIG. 1C, the computing device(s) 106 may perform similar processes as the computing device(s) 104 above to determine the locations of items at the inventory locations 120(1)-(5). For example, the computing device(s) 106 may determine that items 134(1)-(2), which are associated with the first category of items 122(1), are to be placed at the first inventory location 120(1), item 136, which is associated with the second category of items 122(2), is to be placed at the second inventory location 120(2), items 138(3)-(4), which are associated with the third category of items 122(3), are to be placed at the third inventory location 120(3), items 140(1) and 140(4), which are associated with the fourth category of items 122(4), are to be placed at the fourth inventory location 120(4), and items 148(1)-(4), which are associated with the seventh category of items 122(7), are to be placed at the fifth inventory location 120(5).

As shown in the examples of FIGS. 1B-1C, the facilities may select different items, from the same item categories, to be located at the inventory locations. For example, the computing device(s) 104 selected the items 138(1)-(2) to be located at the third inventory location 118(3) while the computing device(s) 106 selected the items 138(3)-(4) to be located at the third inventory location 120(3). This is even though both the third inventory location 118(3) and the third inventory location 120(3) are associated with the same, third category of items 122(3). Additionally, the computing device(s) 104 and the computing device(s) 106 used the same, third template to determine the items and/or the locations of the items. The reasons for selecting the different items may be based on a few factors, such as, but not limited to, user input, the sales data 114, the item data 130, and/or the quantity data 132.

In some instances, the processes described with respect to FIGS. 1A-1C may repeated in order to update which items are for acquisition at the first facility 108 and which items are for acquisition at the second facility 110. For instance, as the sales data 114 changes, items within the first facility 108 and/or the second facility 110 may be replaced with new items that are better suited for sales at the first facility 108 and/or the second facility 110.

As shown in the example of FIGS. 1A-1C, the first facility 108 and the second facility 110 were able to customize the items and/or placements of the items even when the facilities used the same templates. This way, the remote system(s) 102 did not have to replicate planograms for the facilities that indicate the variations between the facilities. This can help save both computing and human resources. Rather, the remote system(s) 102 was able to generate more generate templates that the facilities could use when selecting and placing items.

As an example of how the processes described in FIGS. 1A-1C may operate, an entity may be associated with a first bookstore (e.g., the first facility 108) located in Los Angeles and a second bookstore (e.g., the second facility 110) located in New York. Sales at the first bookstore and/or first region for which the first bookstore is located may be different than sales at the second bookstore and/or second region for which the second bookstore is located. This may be because users located in the first region prefer different categories of books than users located in the second region.

As such, the remote system(s) 102 associated with the entity may perform the processes described above (e.g., receiving input(s), analyzing data, etc.) to determine first categories of books to include at the first bookstore and second categories of books to include at the second bookstore. For example, the remote system(s) 102 may determine to include fictional books at the first inventory location 118(1), non-fictional books at the second inventory location 118(2), best-selling books at the third inventory location 118(3), romance books at the fourth inventory location 118(4), history books at the fifth inventory location 118(5), and geographical books at the sixth inventory location 118(6). Additionally, the remote system(s) 102 may perform the processes described above (e.g., receiving input(s), analyzing data, etc.) to determine identifiers of books and/or the number of books that can be located at each inventory location 118(1)-(6).

The remote system(s) 102 may further determine to include fictional books at the first inventory location 120(1), non-fictional books at the second inventory location 120(2), best-selling books at the third inventory location 120(3), romance books at the fourth inventory location 120(4), and sports books at the fifth inventory location 120(5). Additionally, the remote system(s) 102 may perform the processes described above (e.g., receiving input(s), analyzing data, etc.) to determine identifiers of books and/or the number of books that can be located at each inventory location 120(1)-(5).

In this example, the remote system(s) 102 may generate a first template associated with fictional books and a second template associated with non-fictional books, where both the first bookstore and the second bookstore can use the first and second templates. Additionally, the first bookstore and the second bookstore may include the same category of books at the third inventory locations 118(3), 120(3). However, based on the sales data 114, the remote system(s) 102 may generate a first initial listing of books that may be included the best-selling books at the first bookstore and a second, different initial listing of books that may be included at the best-selling books at the second bookstore. As such, the remote system(s) 102 may generate a third template for the best-selling books at the first bookstore and a fourth, different template for the best-selling books at the second bookstore.

Furthermore, the first bookstore and the second bookstore may also include the same category of books at the fourth inventory locations 118(4), 120(4). However, based on the sales data 114, the remote system(s) 102 may determine to include a greater number of romance books at the first bookstore than at the second bookstore. As such, the remote system(s) 102 may generate a fifth template for the romance books at the first bookstore and a sixth, different template for the romance books at the second bookstore. Moreover, the first bookstore may include categories of books that include history books and geographical books, and the second bookstore may include the category of books that includes sports books. As such, the remote system(s) 102 may generate a seventh template for history books, an eight template for geographical books, and a ninth template for sports books.

The computing device(s) 104 associated with the first bookstore may then receive the template data 126 from the remote system(s) 102. Using the processes described herein (e.g., receiving input(s), analyzing data, etc.), the computing device(s) 104 may determine the locations of the books within the first bookstore. Additionally, the computing device(s) 106 associated with the second bookstore may then receive the template data 126 from the remote system(s) 102. Using the processes described herein (e.g., receiving input(s), analyzing data, etc.), the computing device(s) 106 may determine the locations of the books within the second bookstore.

As shown, by performing the processes described herein, the first bookstore is able to customize the types of books and/or the locations of the books within the first bookstore. Additionally, the second bookstore is able to customize the types of books and/or the locations of the books within the second bookstore. Additionally, even though the types of books and/or locations of the books are customized in each bookstore, the remote system(s) 102 did not have to generate multiple planograms that are specific to the layouts of the books in the different bookstores.

It should be noted that, although the example of FIGS. 1A-1C illustrates two facilities, in other examples, the entity may be associated with more than two facilities. Additionally, although the example of FIGS. 1A-1C illustrate the remote system(s) 102 as being separate from the computing device(s) 104 and the computing device(s), in other examples, the remote system(s) 102 may include the computing device(s) 104 and/or the computing device(s) 106. For example, the remote system(s) 102 may perform the processes described herein with respect to the computing device(s) 104 and/or the computing device(s) 106.

Figure 2:
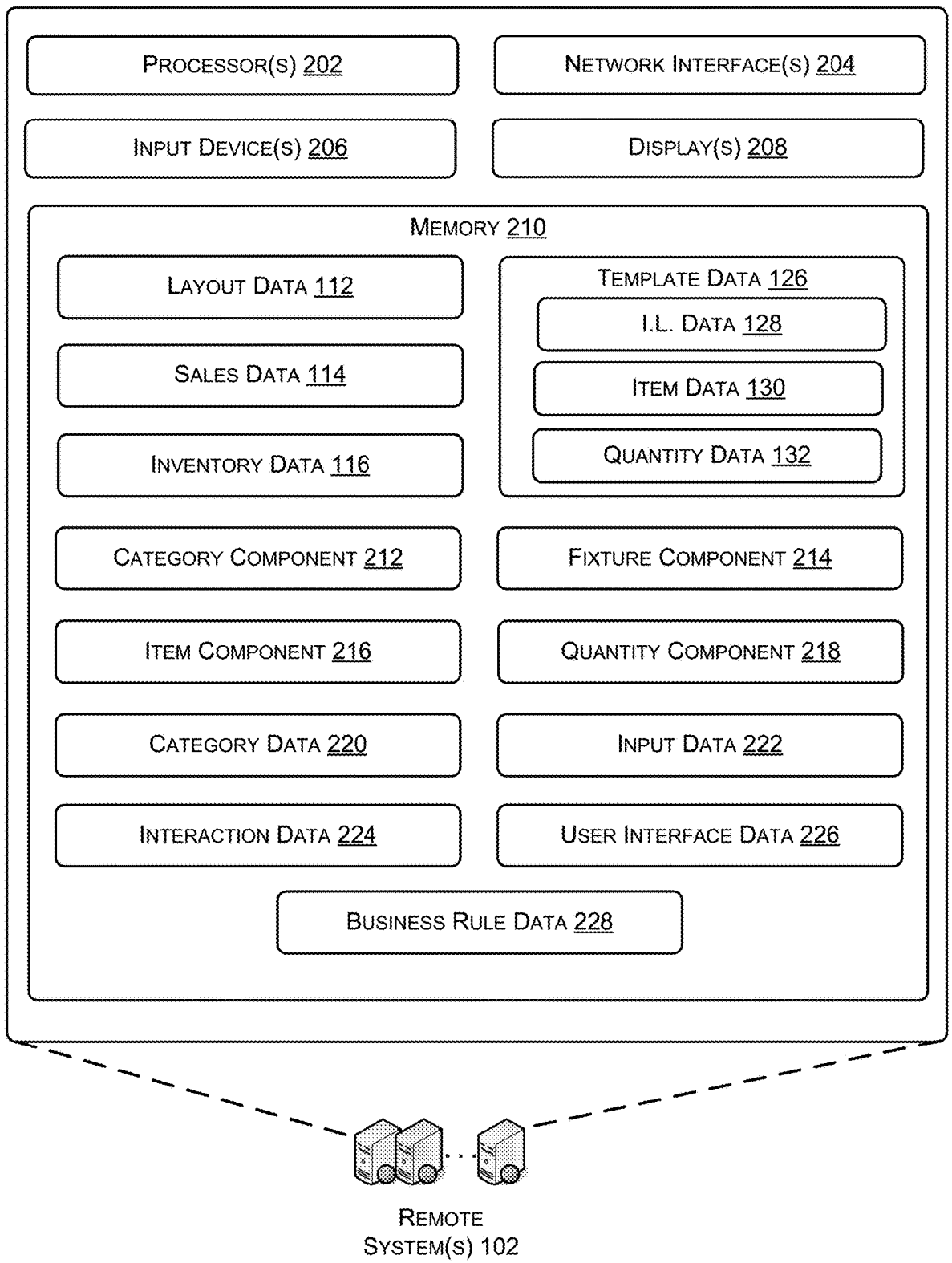
FIG. 2 illustrates a block diagram of an example architecture of a remote system(s), according to examples of the present disclosure.

FIG. 2 illustrates a block diagram of an example architecture of the remote system(s) 102, according to examples of the present disclosure. As shown, the remote system(s) 102 may include processor(s) 202, network interface(s) 204, input device(s) 206, display(s) 208, and memory 210. In some instances, the remote system(s) 102 may include one or more additional components not illustrated in the example of FIG. 2. Additionally, or alternatively, in some instances, the remote system(s) 102 may not include one or more of the network interface(s) 204, the input device(s) 206, and/or the display(s) 208.

As shown, the memory 210 may store at least a category component 212, a fixture component 214, an item component 216, and a quantity component 218. The category component 212 may be configured to perform one or more of the processes described herein to determine which categories should be included in various facilities. For example, the remote system(s) 102 may store category data 220 representing the various category of items that may be located within facilities. In some instances, the category component 212 determines one or more of the categories of items based on receiving, using the input device(s) 206, input data 222 representing one or more selections of the categories of items. Additionally, or alternatively, in some instances, the category component 212 determines the one or more categories of items based on analyzing data (e.g., the layout data 112, the sales data 114, the inventory data 116, interaction data 224, etc.).

The location component 214 may be configured to perform one or more of the processes described herein to determine the locations of and/or types of inventory locations to include within the facilities. For example, in some instances, the fixture component 214 determines the locations of and/or types of inventory locations based on receiving, using the input device(s) 206, input data 222 representing the locations of and/or types of inventory locations. Additionally, or alternatively, in some instances, the fixture component 214 determines the locations of and/or types of inventory locations based on analyzing data (e.g., the layout data 112, the sales data 114, the inventory data 116, the interaction data 224, etc.).

The item component 216 may be configured to perform one or more of the processes described herein to determine the initial items that may be located at inventory locations within the facilities. For example, in some instances, the item component 216 determines the initial items based on receiving, using the input device(s) 206, input data 222 representing the initial items that may be located at the inventory locations. Additionally, or alternatively, in some instances, the item component 216 determines the initial items based on analyzing data (e.g., the layout data 112, the sales data 114, the inventory data 116, the interaction data 224, etc.).

Still, the quantity component 218 may be configured to perform one or more of the processes described herein to determine the quantity of items that are to be located at inventory locations within the facilities. For example, in some instances, the quantity component 218 determines the quantity of items based on receiving, using the input device(s) 206, input data 222 representing the quantity of items to be located at the inventory locations. Additionally, or alternatively, in some instances, the quantity component 218 determines the quantity of items based on analyzing data (e.g., the layout data 112, the sales data 114, the inventory data 116, the interaction data 224, etc.).

As further illustrated in the example of FIG. 2, the remote system(s) 102 may store the interaction data 224 and user interface data 226. The interaction data 224 may represent interactions between users of user devices and digital items being provided by the user devices. For example, the interaction data 224 may represent, but is not limited to, reading speeds of users, page turn speeds of users, items selected by users, items acquired by users, and/or so forth. The user interface data 226 may represent one or more user interfaces for providing the inputs described herein. For example, the user interface data 226 may represent the user interfaces described with respect to FIGS. 4A-4B.

As further illustrated in the example of FIG. 2, the remote system(s) 102 may store business rules data 228. The business rules data 228 may represent one or more business rules that the remote system(s) 102 uses when analyzing data in order to perform the processes described herein. The business rules may include, but are not limited to, a first rule indicating that items may be selected when procurable, a second rule indicating that items may be selected when they exceed a given rating (e.g., three star rating, four star rating, five star rating, etc.), a third business rule indicating time periods (e.g., days of the year, months of the year, etc.) when given items may be selected, a fourth business rule indicating that facilities may obtain items from other facilities when costs of transporting the items are below a threshold cost, a fifth business rule indicating that items may be selected when foreseeable sales of the items are above a threshold (e.g., ten units in a week, ten units in a month, ten units in a year, etc.), and/or any other business rules.

The remote system(s) 102 may use the business rules to determine the initial list of items that may be associated with a category of items at an inventory location. For a first example, the remote system(s) 102 may select items that exceed the given rating and include foreseeable sales that exceed a threshold. For a second example, the remote system(s) 102 may select items that are procurable by a facility and associated with a given category of items.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non- removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable messages between devices, such as the remote system(s) 102, the computing device(s) 104, and the computing device(s) 106, as well as other networked devices. The network interface(s) may include one or more network interface controllers (NICs) or other types of transceiver devices to send and receive messages over network(s). For instance, each of the network interface(s) may include a personal area network (PAN) component to enable messages over one or more short-range wireless message channels. For instance, the PAN component may enable messages compliant with at least one of the following standards IEEE 902.15.4 (ZigBee), IEEE 902.15.1 (Bluetooth), IEEE 902.11 (WiFi), or any other PAN message protocol. Furthermore, each of the network interface(s) may include a wide area network (WAN) component to enable message over a wide area network.

Figure 3:
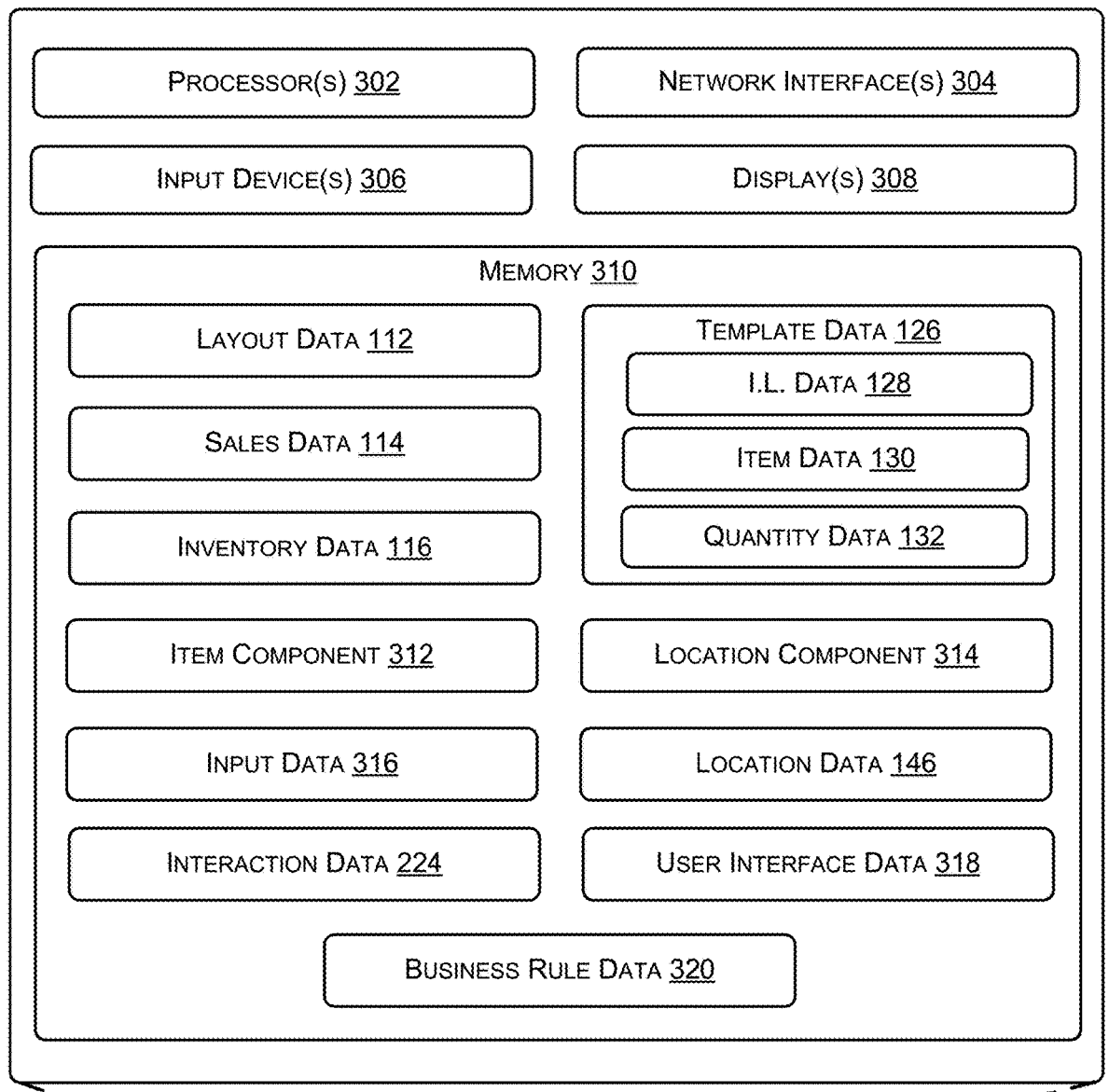
FIG. 3 illustrates a block diagram of an example architecture of computing device(s), according to examples of the present disclosure.

FIG. 3 illustrates a block diagram of an example architecture of the computing device(s) 104 (and/or similarly the computing device(s) 106), according to examples of the present disclosure. As shown, the computing device(s) 104 may include processor(s) 302, network interface(s) 304, input device(s) 306, display(s) 308, and memory 310. In some instances, the computing device(s) 104 may include one or more additional components not illustrated in the example of FIG. 3. Additionally, or alternatively, in some instances, the computing device(s) 104 may not include one or more of the network interface(s) 304, the input device(s) 306, and/or the display(s) 308.

As shown, the memory 310 may store at least an item component 312 and a location component 314. The item component 312 may be configured to perform one or more of the processes described herein to determine identifier of items should be located at the inventory locations. For example, and in some instances, the item component 312 may determine the identifiers of the items based on receiving, using the input device(s) 306, input data 316 representing selections of the identifiers of the items. Additionally, or alternatively, in some instances, the item component 312 may determine the identifiers of the items based on analyzing data (e.g., the item data 130, the quantity data 132, the inventory data 116, the interaction data 224, etc.).

The location component 314 may be configured to perform one or more of the processes described herein to determine locations of the items at the inventory locations. For example, and in some instances, the location component 314 may determine the locations of the items based on receiving, using the input device(s) 306, input data 316 representing selections indicating the locations of the items. Additionally, or alternatively, in some instances, the location component 314 may determine the locations of the items based on analyzing data (e.g., the item data 130, the quantity data 132, the inventory data 116, the interaction data 224, etc.). After determining the locations of the items, the location component 314 may further be configured to generate the location data 146 representing the locations of the items.

As further illustrated in the example of FIG. 3, the computing device(s) 104 may store user interface data 318. The user interface data 318 may represent one or more user interfaces for providing the inputs described herein.

Furthermore, as illustrated in the example of FIG. 3, the computing device(s) 104 may store business rules data 320. In some instances, the business rules data 320 may be similar to the business rules data 228. In other instances, the business rules data 320 may be different than the business rules data 228. For example, the business rules data 320 may represent one or more business rules that differ from the one or more of the business rules represented by the business rules data 228.

The computing device(s) 104 may sue the business rules data 320 when analyzing data using one or more of the processes described herein. For a first example, the computing device(s) 104 may select items that exceed the given rating and include foreseeable sales that exceed a threshold to include at an inventory location. For a second example, the computing device(s) 104 may select items that are procurable by a facility and associated with a given category of items to include at an inventory location.

Figure 4A:
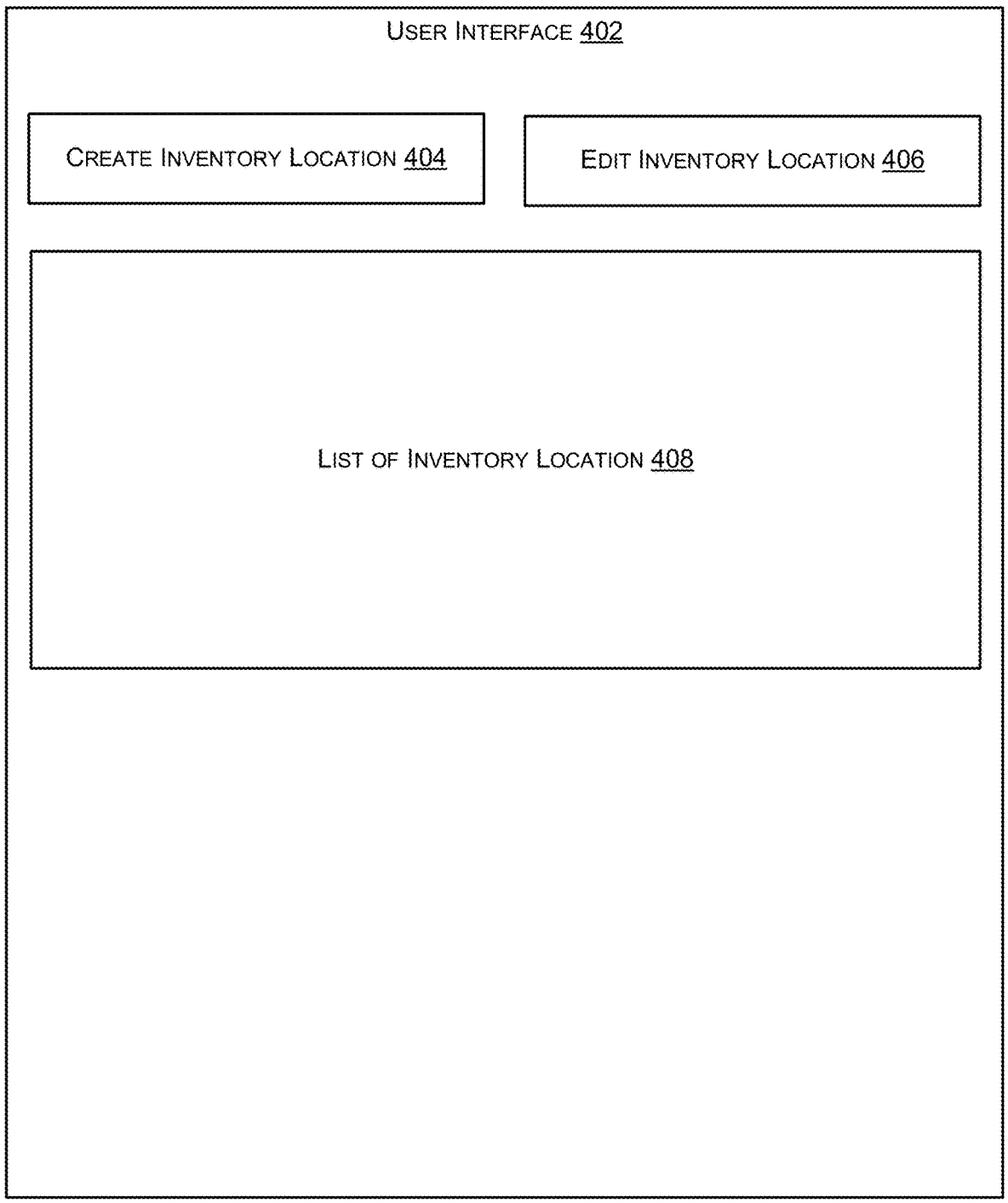
FIGS. 4A-4B illustrate example user interfaces for creating an inventory location at a facility, according to examples of the present disclosure.
Figure 4B:
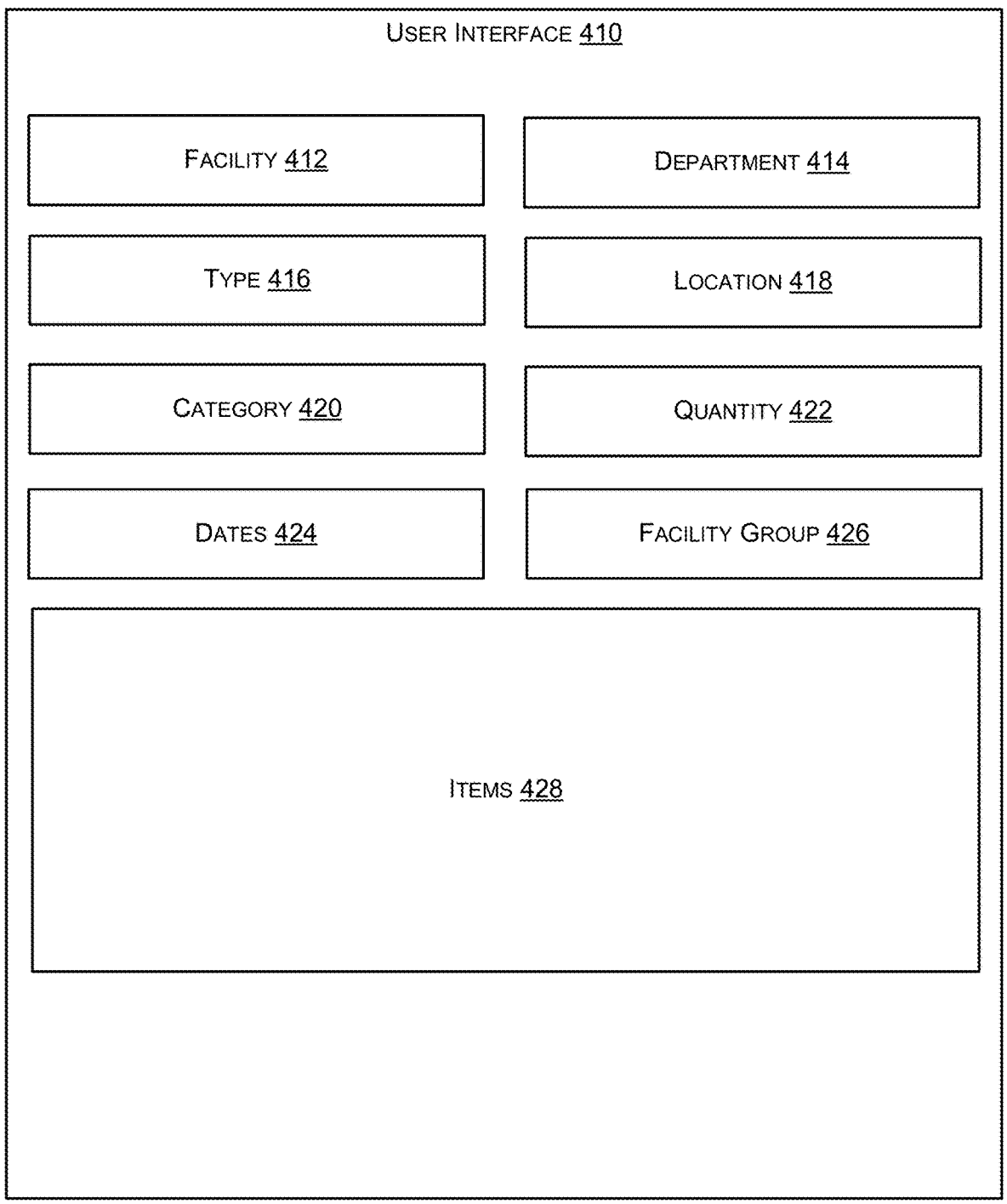

FIGS. 4A-4B illustrate example user interfaces for creating an inventory location at a facility, according to examples of the present disclosure. For example, and as illustrated in FIG. 4A, a user interface 402 may include options associated with inventory locations. As shown, the user interface 402 may include a first inventory element 402 for creating an inventory location, a second interface element 404 for editing an inventory location, and a third interface element 408 that includes a list of inventory locations. As described herein, an interface element may include, but is not limited to, a selectable button, an image, a list, a logo, a dropdown menu, and/or any other content that may be included on a user interface.

As shown in the example of FIG. 4B, a user interface 410 may include options associated with creating an inventory location. For example, the user interface 410 may include a first interface element 412 for inputting a facility for the inventory location, a second interface element 414 for selecting a department within the facility, a third interface element 416 for inputting the type of inventory location, a fourth interface element 418 for selecting a location within the facility for the inventory location, a fifth interface element 420 for inputting the category to associated with the inventory location, a sixth interface element 422 for inputting the quantity of items to include at the inventory location, and a seventh interface element 424 for inputting the scheduled dates at which the inventory location will be used.

The user interface 410 may further include an eight interface element 426 for indicating a grouping for a template. The grouping may indicate which facilities will be associated with the template. For instance, the grouping may indicate listing of the facilities, a region for which facilities are located, and/or the like. Additionally, the user interface 410 includes a ninth interface element 428 for inputting the identifiers of the items that may be included at the inventory location.

While the example of FIG. 4B illustrates the user interface 410 as including nine interface elements 412-428 for inputting informant about an inventory location, in other examples, the user interface 410 may not include one or more of the interface elements 412-428. Additionally, in some examples, the user interface 410 may include one or more additional interface elements for inputting information about the inventory location.

Figure 5:
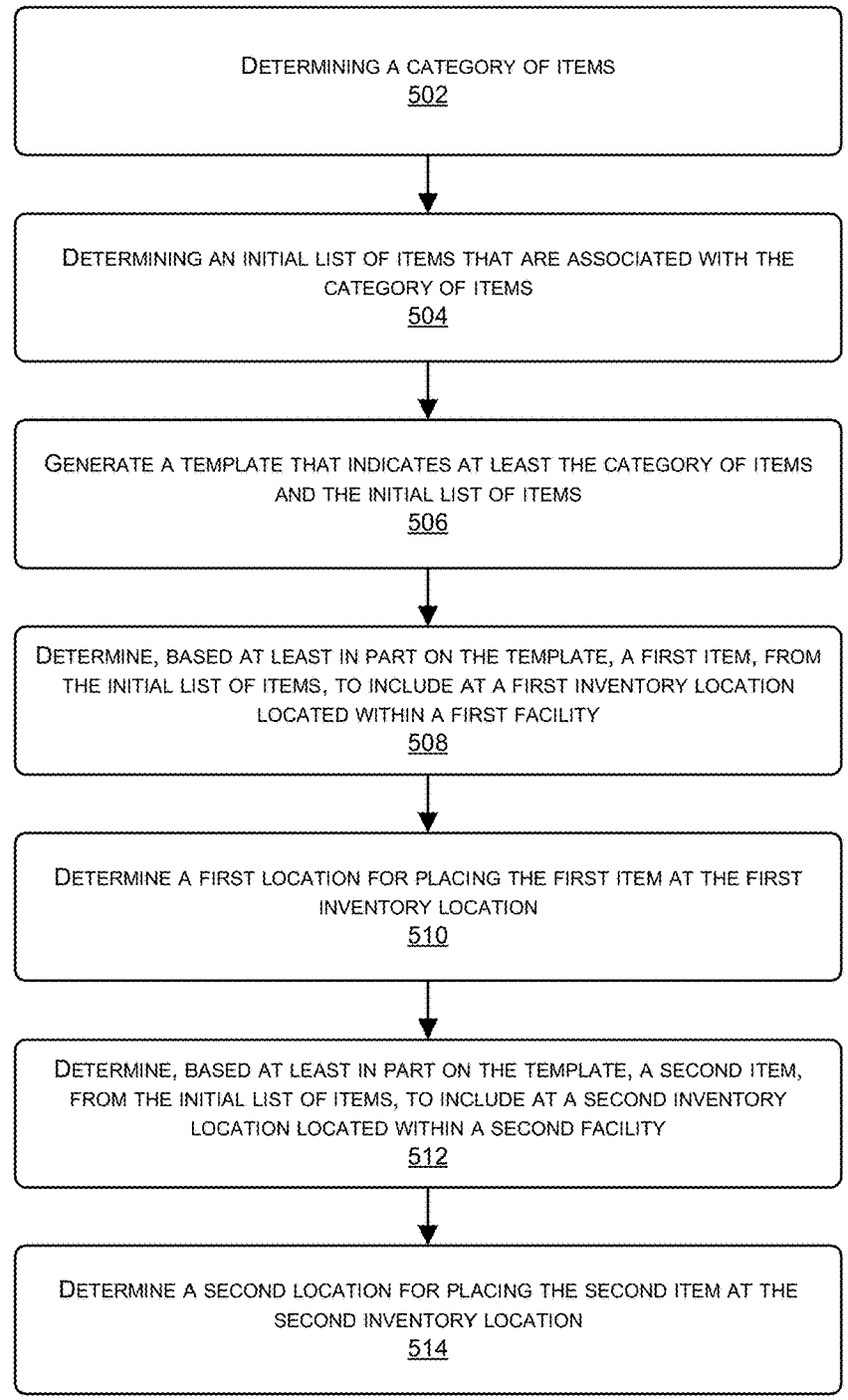
FIG. 5 is an example process for generating a template for facilities and then using the template to place items at the facilities, according to examples of the present disclosure.
Figure 6:
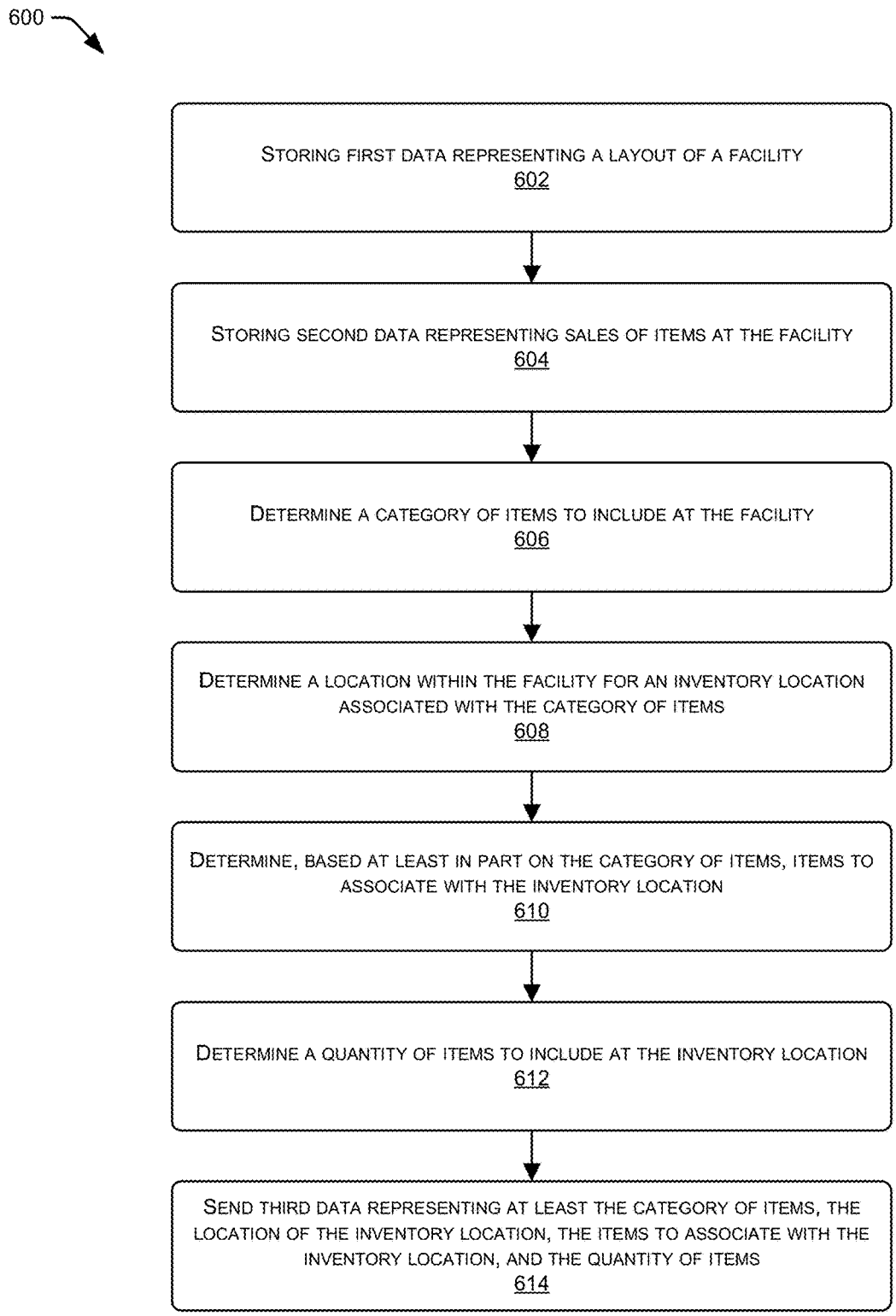
FIG. 6 is an example process for generating a template for a facility, according to examples of the present disclosure.
Figure 7:
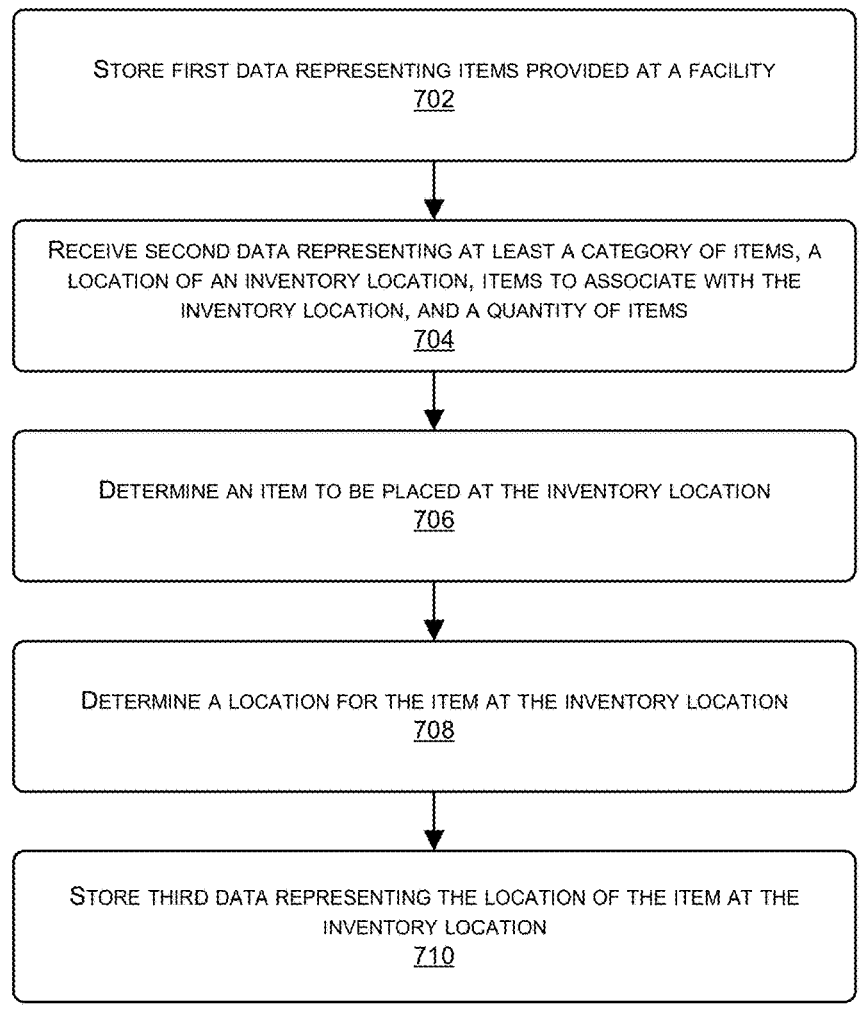
FIG. 7 is an example process for using the initial layout of the facility to determine items and locations of the items within the facility, according to examples of the present disclosure.

FIGS. 5-7 illustrate various processes for implanting the techniques described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 5 is an example process 500 for generating a template for facilities and then using the template to place items at the facilities, according to examples of the present disclosure. At 502, the process 500 may include determining a category of items and at 504, the process 500 may include determining an initial list of items that are associated with the category of items. For instance, a system (e.g., the remote system 102, the computing device(s) 104, and/or the computing device(s) 106) may determine the category of items and the initial list of items. In some instances, the system may determine the category of items and/or the initial list of items based on receiving one or more inputs. In some instances, the system may determine the category of items and/or the initial list of items based on analyzing data, such as sales data.

At 506, the process 500 may include generating a template that indicates at least the category of items and the initial list of items. For instance, the system may generate the template. In some instances, the template may further indicate a location for placing an inventory location, a quantity of items, a schedule for the items, and/or the like. The system may then determine to use the template at a first facility and a second facility. In some instances, the system makes the determination based on sales of items, included in the category of items, and the first facility and the second facility.

At 508, the process 500 may include determining, based at least in part on the template, to include a first item, from the initial list of items, at a first inventory location located within a first facility. For instance, the system may analyze the template to determine the first item. In some instances, the system may further analyze the sales data associated with the first facility to determine the first item. At 510, the process 500 may then determine a first location for placing the first item at the first inventory location. For instance, the system may determine the first location for placing the first item.

At 512, the process 500 may include determining, based at least in part on the template, to include a second item, from the initial list of items, at a second inventory location located within a second facility. For instance, the system may analyze the template to determine the second item. In some instances, the system may further analyze the sales data associated with the second facility to determine the second item. At 514, the process 500 may then determine a second location for placing the second item at the second inventory location. For instance, the system may determine the second location for placing the second item.

FIG. 6 is an example process 600 for initially determining a broad layout of a facility, according to examples of the present disclosure. At 602, the process 600 may include storing first data representing a layout of a facility and at 604, the process 600 may include storing second data representing sales of items at the facility. For instance, the remote system(s) 102 may store the first data (e.g., layout data 112) and the second data (e.g., sales data 114) associated with the facility. In some instances, the second data may represent sales at more than one facility and/or sales at online marketplaces. Still, in some instances, the second data may represent how users interact with items using user devices (e.g., the interaction data 224). For instance, the second data may represent reading data (e.g., reading speeds) of books on user devices.

At 606, the process 600 may include determining a category of items to include at the facility and 608, the process 600 may include determining a location for an inventory location associated with the category of items. For instance, the remote system(s) 102 may determine the category of items based on receiving input(s) indicating the category of items and/or analyzing data (e.g., the second data). The remote system(s) 102 may then determine the location of the inventory location within the facility. In some instances, the remote system(s) 102 may further determine the type of inventory location to associate with the category of items. For instance, if sales for items included in the category of items is high at the facility, then the remote system(s) 102 may select a large inventory location for the category of items.

At 610, the process 600 may include determining, based at least in part on the category of items, items to associate with the inventory location. For instance, the remote system(s) 102 may determine initial items that may be placed at the inventory location, where the initial items are associated with the category of items. In some instances, the remote system(s) 102 may further use the second data (e.g., the sales data 114) to determine the initial items that may be included in the inventory location. For instance, the remote system(s) 102 may determine that the best-selling items, which are associated with the category of items, should be placed at the inventory location.

At 612, the process 600 may include determining a quantity of items to include at the inventory location. For instance, the remote system(s) 102 may determine the quantity of the identified items that should be included at the inventory location. In some instances, the remote system(s) 102 determines the quantity of items based on the type of inventory location. For instance, the larger the inventory location, the larger the quantity of items that may be placed at the inventory location. In some instances, the remote system(s) 102 may use the second data to determine the quantity of items. For instance, the larger the sales numbers associated with the category of items, the larger the quantity of items to include at the inventory location.

At 614, the process 600 may include sending third data representing at least the category of items, the location of the inventory location, the items to associate with the inventory location, and the quantity of items. For instance, the remote system(s) 102 may send the third data to computing device (s) 104 associated with the facility. The computing device(s) 104 may then use the third data to determine the specific items to be placed at the inventory location as well as the locations of the items on the inventory location. In other words, the facility may use the third data as an initial step to later determine the actual items and/or locations of items at the facility.

FIG. 7 is an example process 700 for using the initial layout of the facility to determine items and locations of the items within the facility, according to examples of the present disclosure. At 702, the process 700 may include storing first data representing items provided at a facility. For instance, the computing device(s) 104 may store the first data. In some instances, the first data may include the sales data 114 representing sales that occur at the facility, sales that occur at a region that includes the facility, sales that occurs at other facilities that are associated with the facility, sales that occur at online marketplace(s), and/or the like. In some instances, the first data may include inventory data 117 associated with the facility. Still, in some instances, the first data may include the interaction data 224.

At 704, the process 700 may include receiving second data representing at least a category of items, a location of the inventory location, items to associate with the inventory location, and a quantity of items. For instance, the computing device(s) 104 may receive the second data from the remote system(s) 102. The second data may represent an initial template indicating what items may be placed at the inventory location and/or the quantity of the items that may be placed at the inventory location.

At 706, the process 700 may include determining an item to be placed at the inventory location. For instance, the computing device(s) 104 may determine the item to be placed at the inventory location. In some instances, the computing device(s) 104 determine the item by receiving input representing a selection of the item. In some instances, the computing device(s) 104 determine the item by analyzing the first data. For instance, the computing device(s) 104 may analyze the first data to identify an item, included in the items represented by the second data, that includes high sales. Based on the identification, the computing device(s) 104 may determine that the item should be placed at the inventory location.

At 708, the process 700 may include determining a location for the item at the inventory location. For instance, the computing device(s) 104 may determine the location of the item at the inventory location. In some instances, the computing device(s) 104 determine location by receiving input representing a selection of the location at the inventory location. In some instances, the computing device(s) 104 determine the location by analyzing the first data. For instance, the computing device(s) 104 may analyze the first data to determine that the item includes high sales. Based on the identification, the computing device(s) 104 may determine that the item should be placed at a specific location on the inventory location.

At 710, the process 700 may include storing third data representing the location of the item at the inventory location. For instance, the computing device(s) 204 may generate and then store the third data.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   one or more processors; and one or more computer-readable media storing instructions that, when executed by the one or more processors, cause the one or more computing devices to perform operations comprising:
- storing sales data representing at least sales of items at a first facility including a first floor layout and sales of items at a second facility including a second floor layout different from the first floor layout, wherein an entity is associated with both of the first entity and the second facility;
- determining to include a category of items at the first facility;
- determining to include the category of items at the second facility;
- determining an initial list of items that may located at an inventory location, the initial list of items being associated with the category of items;
- determining, based at least in part on the inventory location, a quantity of items to be located at the inventory location;
- generating a template useable by a first computing device associated with the first facility to vary one or more first items to be included at the first facility or vary how the one or more first items are to be presented at the first facility and useable by a second computing device associated with the second facility to vary one or more second items to be included at the second facility or vary how the one or more second items are to be presented at the second facility, the template indicating at least:
  - the category of items associated with the inventory location;
  - the initial list of items that may be located at the inventory location; and
  - the quantity of items,
- sending template data representing at least the template to the first computing device and the second computing device;
- determining, based at least in part on the sales data and the template data sent to the first device at the first facility, at least a first item, from the initial list of items, to be included at a first inventory location within the first floor layout of the first facility;
- determining, based at least in part on the template data sent to the first device at the first location, a first location for the first item at the first inventory location;
- determining, based at least in part on the sales data and the template data sent to the second device at the second facility, at least a second item, from the initial list of items, to be included at a second inventory location within the second floor layout of the second facility; and
- determining, based at least in part on the template data sent to the second device at the second location, a second location for the second item at the second inventory location,
- wherein at least one of the second item is different than the first item or the second location is different than the first location.

2. The system as recited in claim 1, the operations further comprise:
- determining a schedule indicating a period of time for using the template,
- and wherein the template further indicates the schedule.

3. The system as recited in claim 1, further comprising a display, and wherein the operations further comprise causing the display to present a user interface, the user interface for receiving one or more inputs indicating one or more of the category of items, a location of the inventory location, the initial list of items, or the quantity of items.

4. A method comprising:
- determining a category of items associated with an inventory location type;
- determining an initial list of items that are associated with the category of items;
- generating a template useable by a first computing device associated with a first facility to vary one or more first items to be included at the first facility or vary how the one or more first items are to be presented at the first facility and useable by a second computing device associated with a second facility to vary one or more second items to be included at the second facility or vary how the one or more second items are to be resented at the second facility, the template indicating at least the category of items and the initial list of items that are associated with the category of items;
- generating first data representing the template, the first data used by the first computing device associated with the first facility for selecting at least a first item, from the initial list of items, to include at a first inventory location associated with the inventory location type within the first facility; and
- generating second data representing the template, the second data used by the second computing device associated with the second facility for selecting at least a second item, from the initial list of items, to include at a second inventory location associated with the inventory location type within the second facility.

5. The method as recited in claim 4, further comprising:
- determining a quantity of items associated with the inventory location type,
- and wherein the template further indicates the quantity of items.

6. The method as recited in claim 4, further comprising:
- determining a time period associated with the inventory location type; and
- and wherein the template further indicates the time period.

7. The method as recited in claim 4, further comprising:
- storing third data representing sales of items associated with facilities, the facilities including at least the first facility and the second facility, and wherein determining the initial list of items comprises analyzing the third data to determine the initial list of items.

8. The method as recited in claim 4, further comprising:
- storing third data representing sales of items associated with the first facility;
- determining, based at least in part on the third data, to include the category of items at the first facility, wherein generating the first data is based at least in part on determining to include the category of items at the first facility;
- storing fourth data representing sales of items associated with the second facility;
- determining, based at least in part on the fourth data, to include the category of items at the second facility, wherein generating the second data is based at least in part on determining to include the category of items at the second facility.

9. The method as recited in claim 4, wherein the category of items is a first category of items, the initial list of items is a first initial list of items, and the template is a first template, and wherein the method further comprises:

determining a second category of items to include at the first facility;

determining a second initial list of items that are associated with the second category of items;

generating a second template that indicates at least the second category of items and the second initial list of items that are associated with the second category of items; and generating third data representing the second template, the third data used for selecting at least a third item, from the second initial list of items, to include at a third inventory location within the first facility.

10. The method as recited in claim 9, further comprising:
determining the second category of items to include at the second facility;

determining a third initial list of items that are associated with the second category of items, the third initial list of items being different than the second initial list of items;

generating a third template that indicates at least the second category of items and the third initial list of items that are associated with the second category of items; and generating fourth data representing the third template, the fourth data used for selecting at least a fourth item, from the third initial list of items, to include at a fourth inventory location within the second facility.

11. The method as recited in claim 9, further comprising:
determining a first quantity of items associated with the first facility, wherein the second template further indicates the first quantity of items;

determining the second category of items to include at the second facility;

determining a third quantity of items associated with the second facility;

generating a third template that indicates at least the second category of items, the second initial list of items that are associated with the second category of items, and the second quantity of items; and generating fourth data representing the third template, the fourth data used for selecting at least a fourth item, from the third initial list of items, to include at a fourth inventory location within the second facility.

12. The method as recited in claim 4, further comprising:
displaying a user interface associated with generating the template, wherein at least one of:
determining the category of items comprises receiving, using the user interface, one or more first inputs indicating the category of items; and determining the initial list of items comprises receiving, using the user interface, one or more second inputs indicating the initial list of items.

13. The method as recited in claim 4, wherein the initial list of items is a first initial list of items and the template is a first template, and wherein the method further comprises:
after generating the first template, determining a second initial list of items that are associated with the category of items, the second initial list of items being different than the first initial list of items;

generating a second template that indicates at least the category of items and the second initial list of items that are associated with the category of items;

generating third data representing the second template, the third data used for selecting at least a third item, from the second initial list of items, to include at the first inventory location associated with the inventory location type within the first facility; and generating fourth data representing the second template, the fourth data used for selecting at least a fourth item, from the second initial list of items, to include at the second inventory location associated with the inventory location type within the second facility.

14. The method as recited in claim 4, further comprising:
storing third data representing sales of items at the first facility;

selecting, based at least in part on the third data and the template, the first item, from the initial list of items, to include at the first inventory location within the first facility;

storing fourth data representing sales of items at the second facility; and selecting, based at least in part on the fourth data and the template, the second item, from the initial list of items, to include at the second inventory location within the second facility.

15. The method as recited in claim 4, further comprising:
storing third data representing sales of items at the first facility;

selecting, based at least in part on the third data, a first location for the first item at the first inventory location;

storing fourth data representing sales of items at the second facility; and selecting, based at least in part on the fourth data, a second location for the second item at the second inventory location.

16. A system comprising:
one or more processors; and
one or more computer-readable media storing instructions that, when executed by the one or more processors, cause the one or more computing devices to perform operations comprising:
determining a category of items associated with an inventory location;

determining an initial list of items that may be included at the inventory location, the initial list of items being associated with the category of items;

determining a quantity of items to include at the inventory location;

generating a template useable by a first computing device associated with a first facility to vary one or more first items to be included at the first facility or vary how the one or more first items are to be presented at the first facility and useable by a second computing device associated with a second facility to vary one or more second items to be included at the second facility or vary how the one or more second items are to be presented at the second facility, the template indicating at least the category of items, the initial list of items, and the quantity of items; and generating data representing the template, the data for used selecting at least an item, from the initial list of items, to include at the inventory location within the first facility or the second facility.

17. The system as recited in claim 16, the operations further comprising:
determining a location within the first facility or the second facility for placing the inventory location,
wherein the template further indicates the location within the first facility or the second facility.

18. The system as recited in claim 16, wherein the data is first data, the item is a first item and the inventory location is a first inventory location, and wherein the operations further comprise generating second data representing the template, the second data used for selecting at least a second item, from the initial list of items, to include at a second inventory location within the second facility, the second item being different than the first item.

19. The system as recited in claim 16, wherein the inventory location is a first inventory location, the initial list of items is a first initial list of items, the quantity of items is a first quantity of items, and the template is a first template, and wherein the operations further comprise:
   determining the category of items associated with a second inventory location;
   determining a second initial list of items that may be included at the second inventory location, the second initial list of items being associated with the category of items;
   determining a second quantity of items to include at the second inventory location; and
   generating a second template that indicates at least the category of items, the second initial list of items, and the second quantity of items,
   and wherein at least one of the second initial list of items is different than the first initial list of items or the second quantity of items is different than the first quality of items.

20. The system devices as recited in claim 16, the operations further comprising:
   storing sales data associated with facilities, the facilities including at least the first facility and the second facility,
   and wherein at least one of determining the category of items or determining the initial list of items is based at least in part on the sales data.

* * * * *